(12) United States Patent
Kisun et al.

(10) Patent No.: US 11,867,125 B2
(45) Date of Patent: Jan. 9, 2024

(54) FUEL MANIFOLD ADAPTER

(71) Applicant: PRATT & WHITNEY CANADA CORP., Longueuil (CA)

(72) Inventors: Gavin Rohiteshwar Kisun, Mississauga (CA); Guy Lefebvre, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/363,423

(22) Filed: Jun. 30, 2021

(65) Prior Publication Data

US 2023/0003171 A1    Jan. 5, 2023

(51) Int. Cl.
  *F02C 7/22*     (2006.01)
  *F23R 3/60*     (2006.01)

(52) U.S. Cl.
  CPC ........ *F02C 7/222* (2013.01); *F05D 2220/323* (2013.01); *F05D 2240/35* (2013.01); *F05D 2260/31* (2013.01); *F23R 3/60* (2013.01)

(58) Field of Classification Search
  CPC ...................................................... F02C 7/222
  See application file for complete search history.

(56) References Cited

U.S. PATENT DOCUMENTS

| 4,066,281 A | 1/1978 | DeBonis |
| 4,708,371 A | 11/1987 | Elsworth et al. |
| 8,172,272 B2 | 5/2012 | Petit et al. |
| 9,194,297 B2 | 11/2015 | Pelletier et al. |
| 2015/0176496 A1* | 6/2015 | Zordan ................... F02C 7/228 137/561 A |
| 2015/0361897 A1 | 12/2015 | Steele |

(Continued)

FOREIGN PATENT DOCUMENTS

| CA | 2714826 C | 7/2014 |
| DE | 102016226019 A1 | 6/2018 |
| GB | 2461503 A | 1/2010 |

OTHER PUBLICATIONS

European Search Report issued in counterpart application 22171405.8 dated Oct. 21, 2022.

*Primary Examiner* — Katheryn A Malatek
*Assistant Examiner* — Alyson Joan Harrington
(74) *Attorney, Agent, or Firm* — NORTON ROSE FULBRIGHT CANADA LLP

(57) ABSTRACT

A fuel manifold adapter for a fuel system of an aircraft engine, the fuel manifold adapter comprising: a body having a body-output interface defining a downstream end of a body passage including a body bore about a bore axis, the body-output interface movably and fluidly connectable to a first component of the fuel system mounted to a first mounting point of the engine, and a body-input interface defining an upstream end of the body passage, the body-input interface rigidly and fluidly connectable to a second component of the fuel system mounted to a second mounting point of the engine, and a transfer tube having an upstream-tube end slidably engaged with the body along the bore axis via the body bore, the transfer tube having a downstream-tube end opposite the upstream-tube end slidably engageable along the bore axis with the first component, the downstream-tube end defining a downstream end of the fuel manifold adapter relative to fuel flow through the fuel manifold adapter.

11 Claims, 10 Drawing Sheets

(56) References Cited

U.S. PATENT DOCUMENTS

| | | | |
|---|---|---|---|
| 2016/0305667 A1* | 10/2016 | Wolfe | F02C 7/224 |
| 2018/0291976 A1* | 10/2018 | Seeley | F02C 7/222 |
| 2019/0234310 A1 | 8/2019 | Morenko | |
| 2020/0095935 A1 | 3/2020 | Morenko | |
| 2020/0109643 A1 | 4/2020 | Silva et al. | |

* cited by examiner

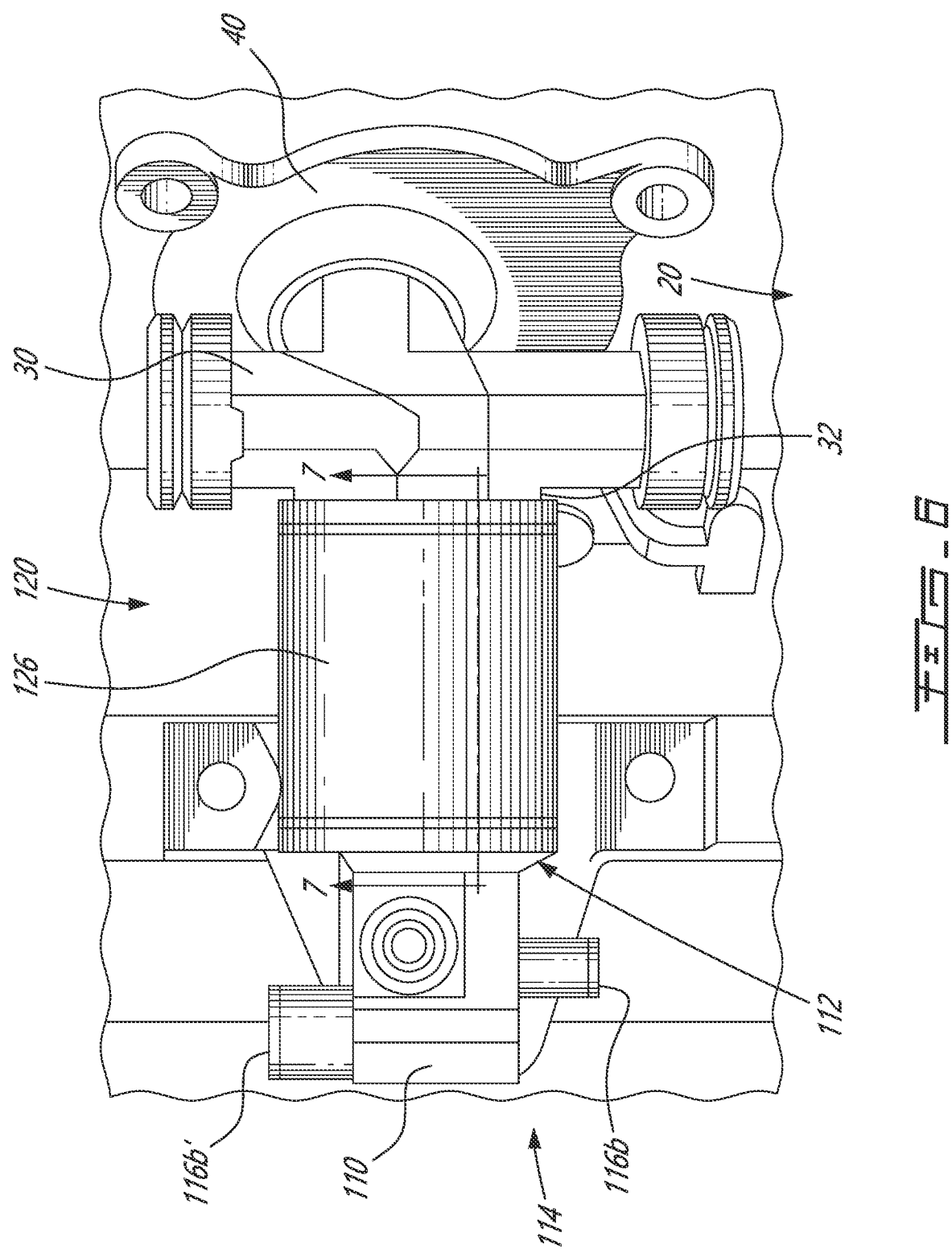

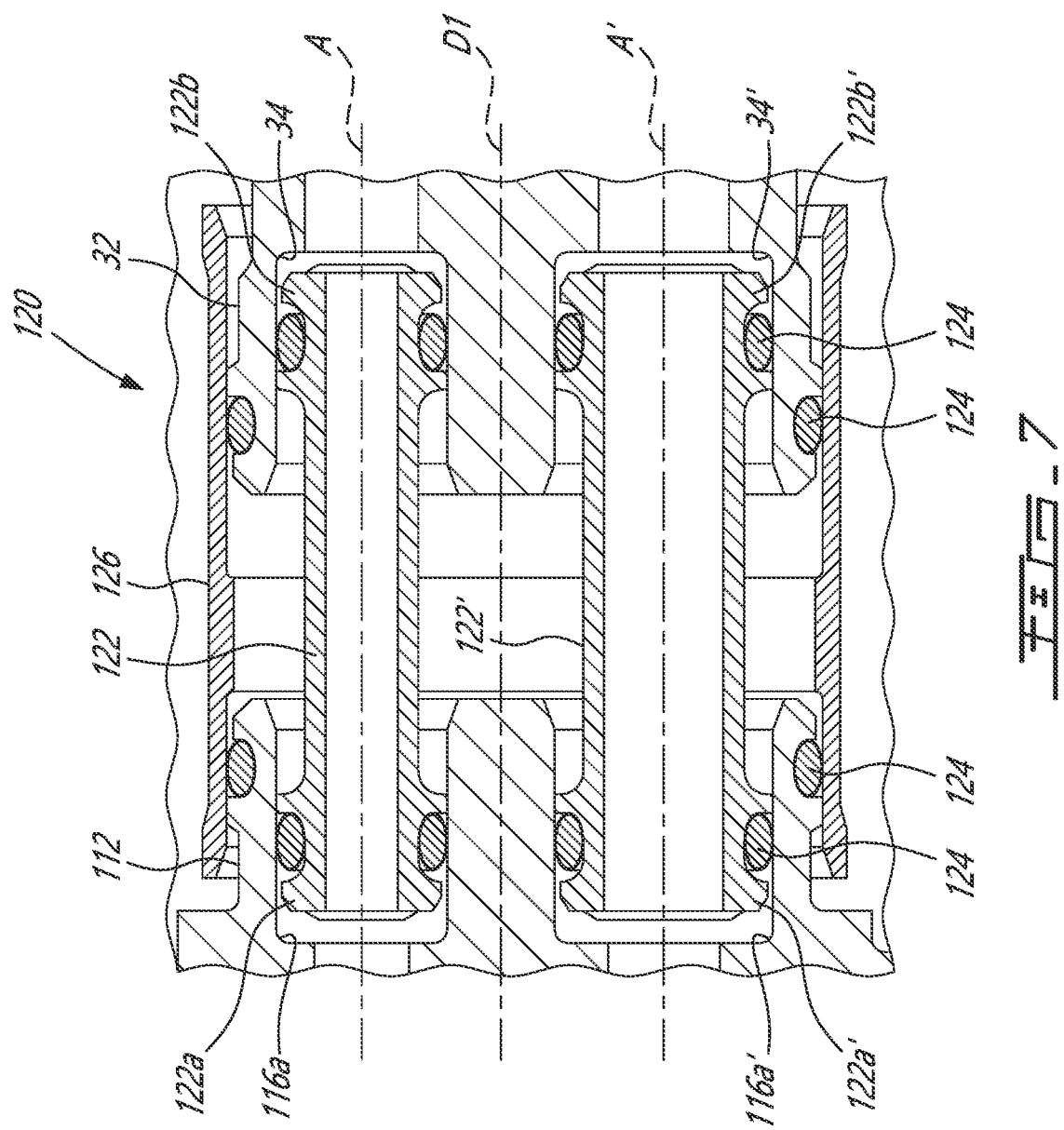

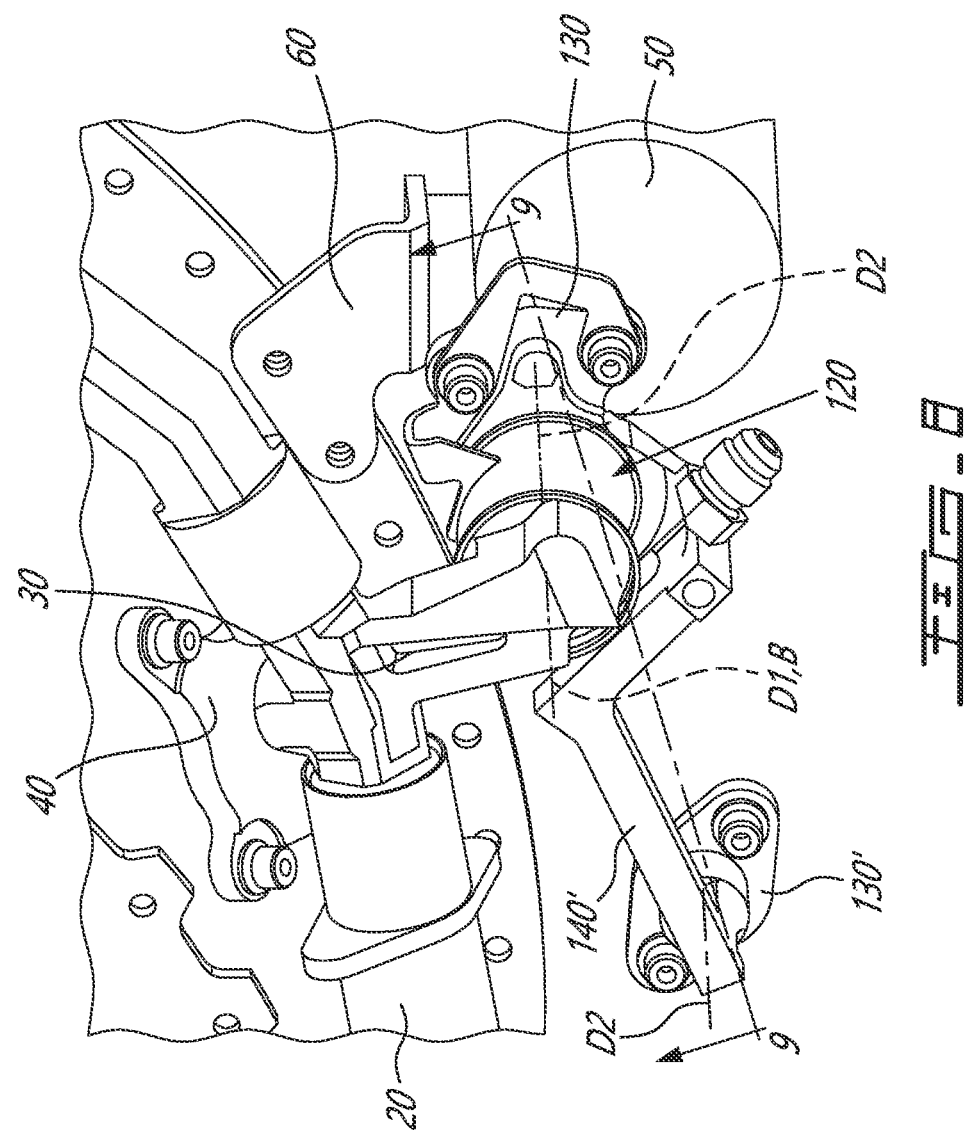

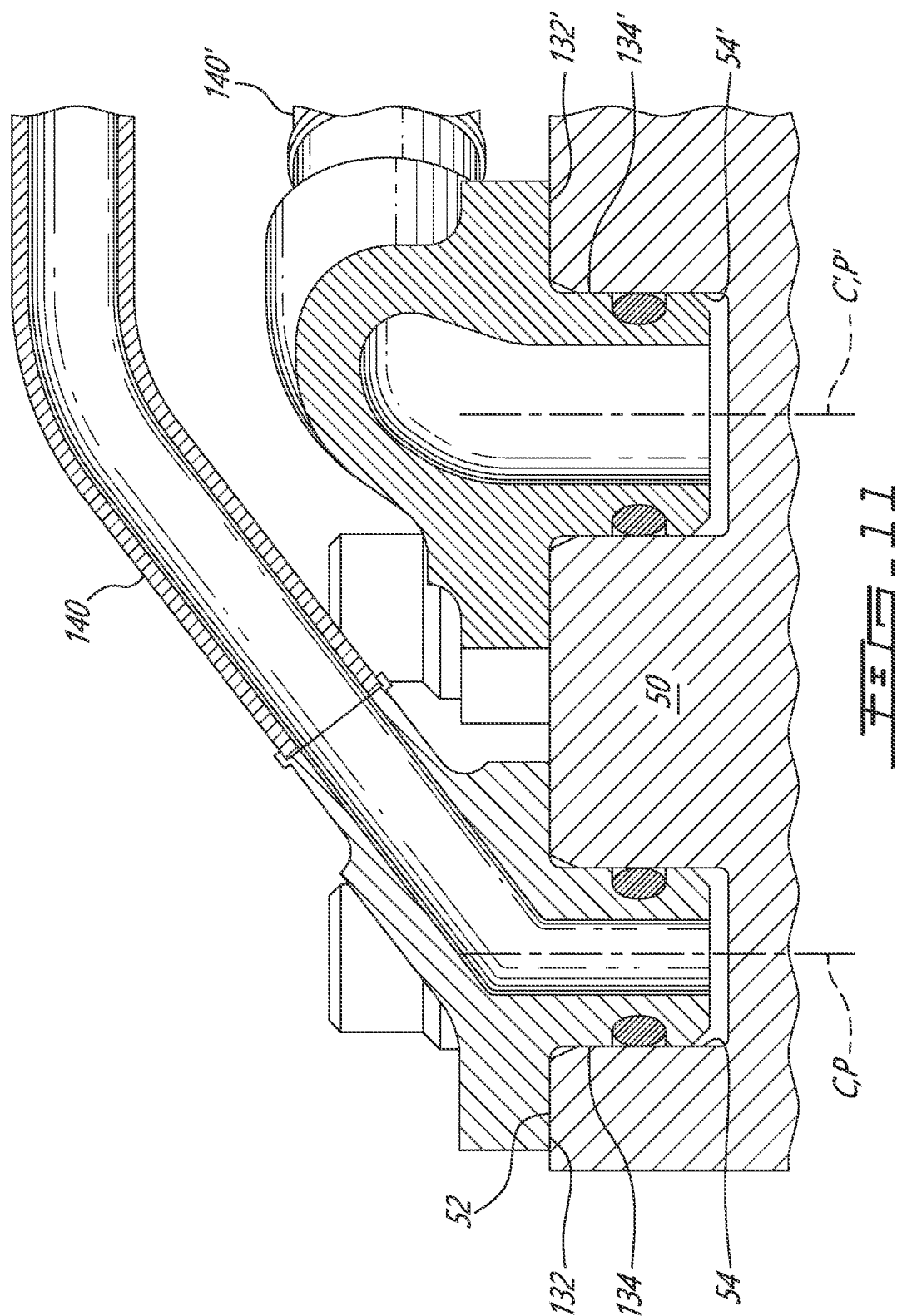

FUEL MANIFOLD ADAPTER

TECHNICAL FIELD

This disclosure relates generally to fluid transfer and, more particularly, to a fuel manifold adapter for transferring fuel in, for example, a fuel transfer system for a gas turbine engine or the like.

BACKGROUND OF THE ART

Various systems are known in the art for transferring fuel between a fuel source and a fuel nozzle of a gas turbine engine. While these known systems may suit their intended purpose, there remains room for improvement in the art.

SUMMARY

In an aspect of the present technology, there is provided a fuel manifold adapter for a fuel system of an aircraft engine, the fuel manifold adapter comprising: a body having a body-output interface defining a downstream end of a body passage including a body bore about a bore axis, the body-output interface movably and fluidly connectable to a first component of the fuel system mounted to a first mounting point of the engine, and a body-input interface defining an upstream end of the body passage, the body-input interface rigidly and fluidly connectable to a second component of the fuel system mounted to a second mounting point of the engine, and a transfer tube having an upstream-tube end slidably engaged with the body along the bore axis via the body bore, the transfer tube having a downstream-tube end opposite the upstream-tube end slidably engageable along the bore axis with the first component, the downstream-tube end defining a downstream end of the fuel manifold adapter relative to fuel flow through the fuel manifold adapter.

In another aspect of the present technology, there is provided a fuel manifold adapter interchangeably connectable between respective fuel manifolds and fuel sources of different aircraft engine platforms, the fuel manifold adapter comprising: a body having a body-input interface and a body-output interface, the body-input interface rigidly connectable to the fuel source of a given one of the different engine platforms so as to locate the body-output interface in alignment with a nozzle-input interface of the fuel manifold of the given one of the engine platforms, the body-output interface slidably engaged with an upstream-tube end of a linear transfer tube having a downstream-tube end slidably engaged with the nozzle-input interface, the body-output interface and the nozzle-input interface slidably engaged via the linear transfer tube and thermally decoupled via the linear transfer tube.

In yet another aspect of the present technology, there is provided an aircraft engine comprising: a fuel manifold having an inlet nozzle, the fuel manifold mounted at a first mounting point of the aircraft engine, the inlet nozzle having a nozzle bore facing in a first direction; a fuel source mounted at a second mounting point of the aircraft engine, the fuel source having a source bore facing in a second direction; a fuel manifold adapter in fluid communication between the fuel source and the inlet nozzle, the fuel manifold adapter including: a body defining a body bore about a bore axis; a transfer tube having an upstream-tube end slidably engaged with the body along the bore axis via the body bore, and a downstream-tube end opposite the upstream-tube end slidably engaged with the inlet nozzle along the bore axis via the nozzle bore; a flanged connector extending along a connector axis, the flanged connector matingly engaged along the connector axis with and fastened to the fuel source via the source bore, and a conduit routed from a downstream-conduit end in fluid communication with the body bore to an upstream-conduit end in fluid communication with the flanged connector.

DESCRIPTION OF THE DRAWINGS

Reference is now made to the accompanying figures in which:

FIG. 6 is a plan view of the fuel manifold adapter of FIG. 3;

FIG. 7 is a cross-section view taken along the line 7-7 of FIG. 6;

FIG. 8 is a perspective view of another embodiment of a fuel manifold adapter;

FIG. 11 is a cross-section view taken along the line 11-11 of FIG. 10.

DETAILED DESCRIPTION

Figure 1:
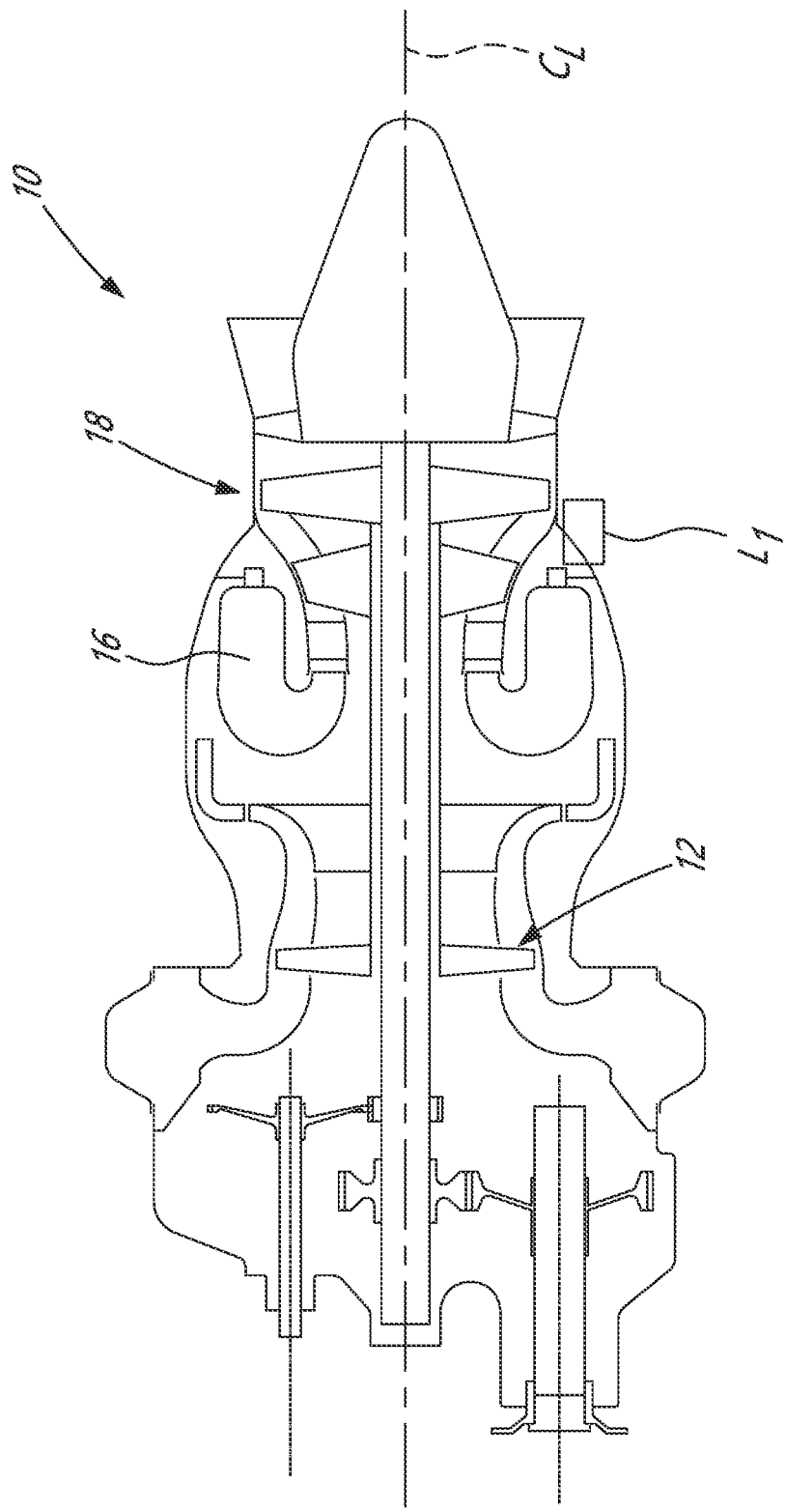
FIG. 1 is a schematic cross sectional view of a gas turbine engine.

FIG. 1 illustrates an aircraft engine 10 of a type preferably provided for use in subsonic flight. According to the illustrated example, the engine 10 is a turboshaft gas turbine engine generally comprising in serial flow communication a compressor 12 for pressurizing the air, a combustor 16 in which the compressed air is mixed with fuel and ignited for generating an annular stream of hot combustion gases, and a turbine section 18 for extracting energy from the combustion gases. There will now be described a fuel manifold adapter 100 (the adapter 100) used in a hot section of the engine, generally shown at L1, in connection with a fuel manifold 20 (FIG. 2) of a fuel system of the engine 10 located proximate to the combustor 16.

Figure 2:
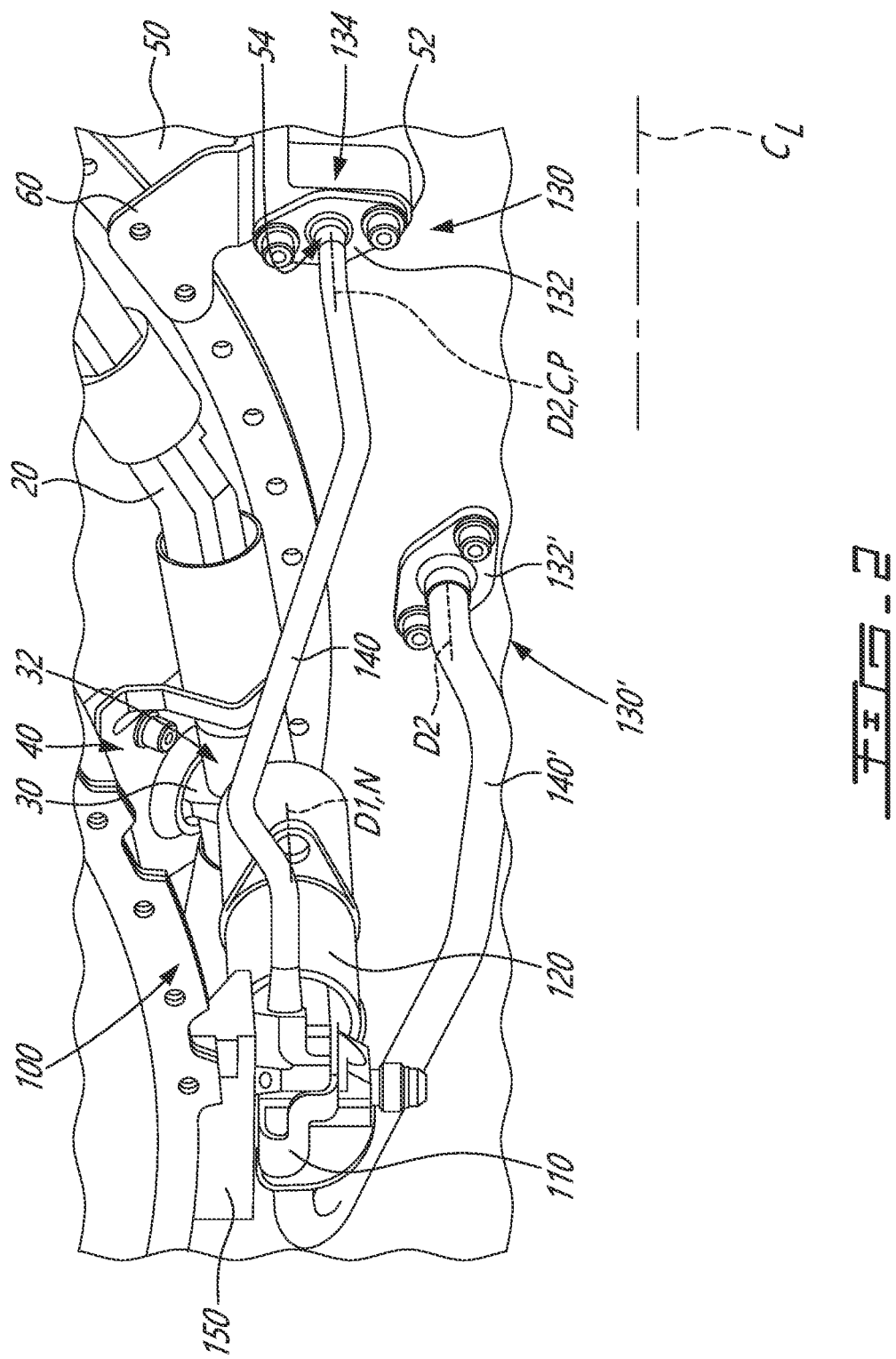
FIG. 2 is a perspective view of an embodiment of a fuel manifold adapter.

Turning now to FIG. 2, the adapter 100 is disposed in fluid communication between a fuel inlet nozzle 30 (the inlet nozzle 30) supported by a first mount 40 (or flange 40 of the inlet nozzle 30), and a fuel source 50 (the source 50) for instance provided in the form of a flow divider valve and supported by a second mount 60 (or bracket 60 of the source 50). The inlet nozzle 30 and the source 50 are also respectively referred to as a first component and a second component of the fuel system of the engine 10. Via the first mount 40 and the second mount 60, the inlet nozzle 30 and the source 50 are respectively mounted at a first mounting point of the engine 10 and at a second mounting point of the engine 10 each being susceptible to thermal growth. Due to the thermal growth occurring as the engine 10 operates, the first and second mounting points move relative to one another with their respective mounted components. In the illustrated embodiment, the first mounting point is on a turbine support case of the engine 10. The first mount 40 is integral to the inlet nozzle 30 and fastened directly to the turbine support case. The second mounting point is located fore of the first mounting point on a peripheral flange of the turbine support case. The second mounting point is also located radially outward of the first mounting point relative to a center line CL of the engine 10 (FIG. 1). In other embodiments, the second mounting point is located aft of the first mounting point, for example on a turbine exhaust case of the engine 10.

Figure 3:
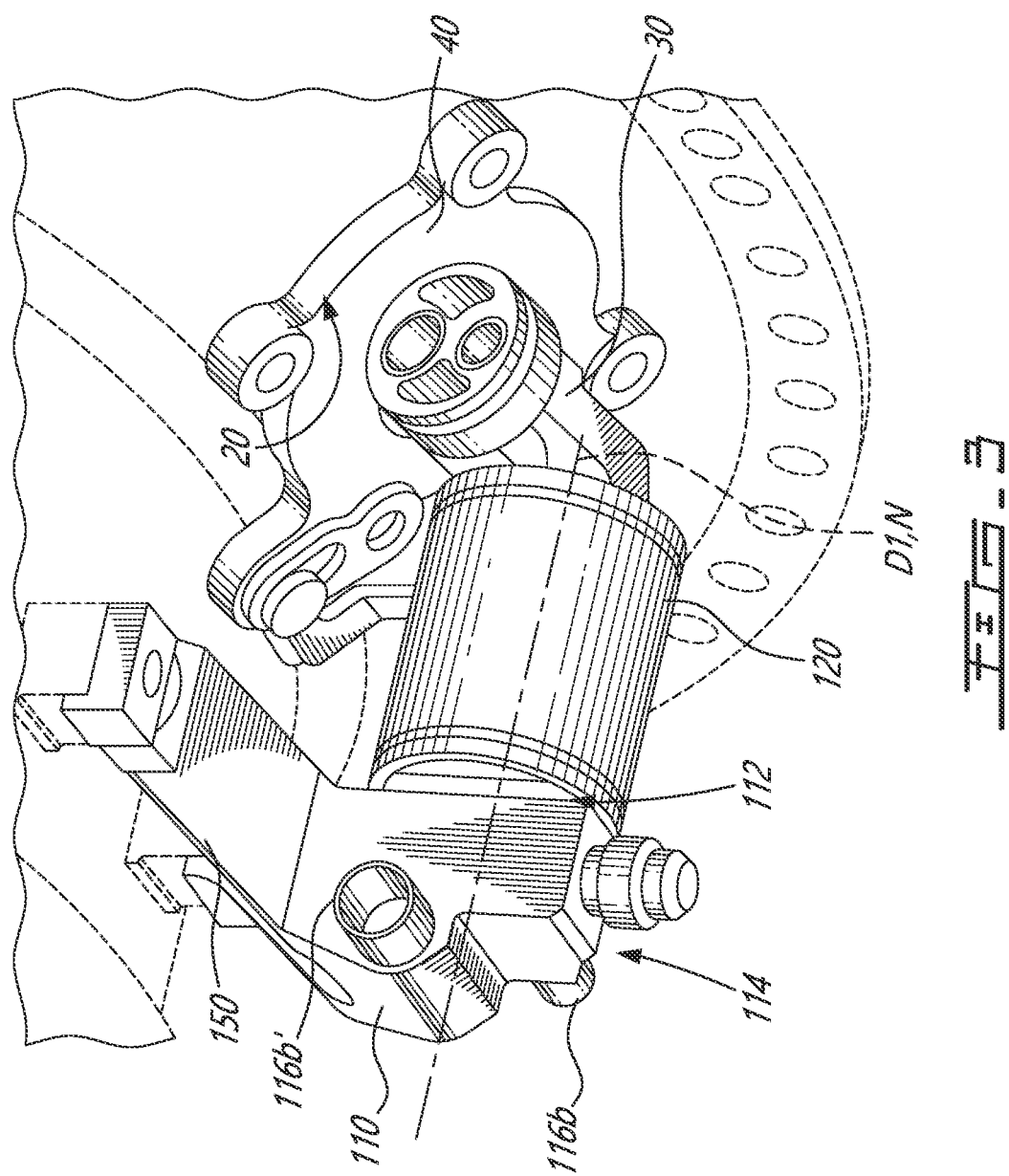
FIG. 3 is a perspective view of another embodiment of a fuel manifold adapter.
Figure 5:
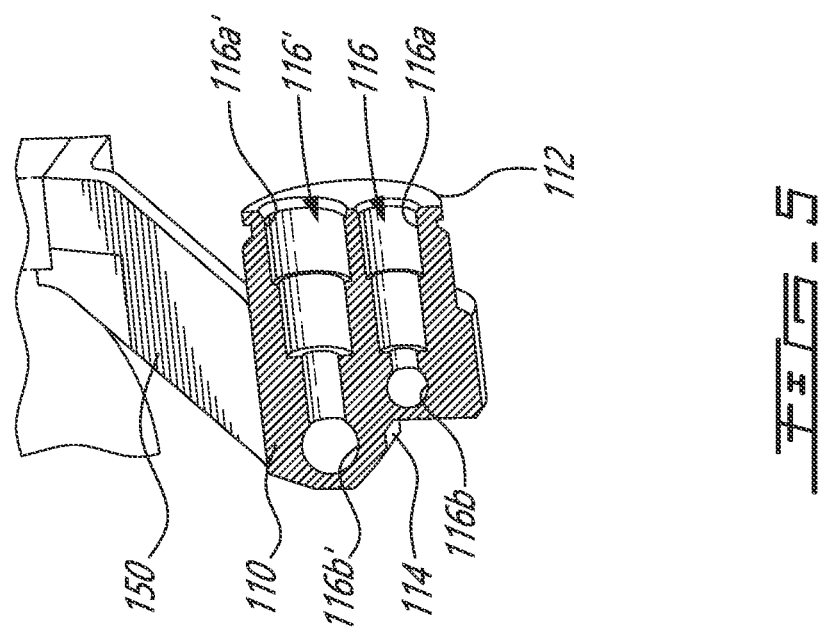
FIG. 5 is a cross-section view taken along the line 5-5 of FIG. 4.

The adapter 100 includes a body 110 that is held in position fixedly relative to the source 50 yet movably relative to the inlet nozzle 30 so as to mitigate stresses imparted to the inlet nozzle 30 by the adapter 100 as the body 110 moves with the source 50 to and from the inlet nozzle 30. The body 110 is mounted at a third mounting point of the engine 10 via a third mount 150 (or bracket 150 of the body 110), supporting the adapter 100 in position relative to the source 50. The third mounting point is located aft of the first mounting point, on a peripheral flange of the turbine exhaust case of the engine 10. In other embodiments, the third mount 150 is integral to the body 110 (as shown for example in FIG. 3). In yet other embodiments, the body 110 could be mounted to the source 50 (as shown for example in FIG. 8) and the third mount 150 could be omitted.

A body-output interface 112 of the body 110 movably interfaces with a nozzle-input interface 32 (or upstream end of the inlet nozzle 30) via a transfer tube assembly 120 located at a downstream end (or output end) of the adapter 100. The transfer tube assembly 120 may be said to thermally and dynamically decouple the body-output interface 112 and a remainder of the adapter 100 from the inlet nozzle 30. At an upstream end (or input end) of the adapter 100, a body-input interface 114 of the body 110 fixedly interfaces with a source-output interface 52 (or downstream end of the source 50) via a flanged connector 130 and a conduit 140. The conduit 140 comprises a rigid tube routed from the flanged connector 130 to the body 110. The conduit 140 and the flanged connector 130 can also be described as a rigid supply line which, depending on the embodiment, can form part of the adapter 100 or the source 50. In this embodiment, the supply line forms part of the adapter 100. The conduit 140 may be said to rigidly connect the flanged connector 130 and the body 110 to one another. A fuel path through the adapter 100 extending from the source 50 to the inlet nozzle 30 is defined successively by the flanged connector 130, the conduit 140, the body 110 and the transfer tube assembly 120. The fuel path can consist of a primary fuel path and a secondary fuel path both routed through the adapter 100 separately from one another. The forthcoming description will focus on features of the adapter 100 defining the primary fuel path, as corresponding features of the adapter 100 defining the secondary fuel path are similar, unless stated otherwise.

Still referring to FIG. 2, according to the illustrated embodiment, the inlet nozzle 30 interfaces with the first mounting point via the first mount 40 so as to orient the nozzle-input interface 32 in a first direction D1 having an axial component parallel to the center line CL of the engine 10. In the first direction D1, the nozzle-input interface 32 extends aft relative to the first mounting point. The second mount 60 holds the source 50 so as to orient the source-output interface 52 in a second direction D2 having an axial component parallel to the center line CL of the engine 10. The first direction D1 and the direction D2 are in this arrangement parallel to one another and to the center line CL of the engine 10, although other arrangements are possible. Also, the nozzle-input interface 32 and the source-output interface 52 are positioned so as to be radially close to one another relative to the center line CL. This disposition allows the adapter 100 to have a minimal radial footprint as it extends from the source-output interface 52 to the nozzle-input interface 32. As such, the inlet nozzle 30, the source 50 and the adapter 100 can be made to fit inside a radially outer envelope of the turbine section 18 defined by the outside of the turbine support and exhaust cases up to a radially outer limit of the engine 10.

The adapter 100 is positioned such that the body-output interface 112 is oriented opposite the first direction D1 across from the nozzle-input interface 32 and the body-input interface 114 is oriented in such a way that the flanged connector 130 rigidly connected thereto is oriented opposite the second direction D2 across from the source-output interface 52. The connections between the body 110 and the inlet nozzle 30 and between the body 110 and the source 50 are directional. Indeed, connecting the body-output interface 112 to the nozzle-input interface 32 via the transfer tube assembly 120 places the body-input interface 114 in an orientation suitable for it to be connectable to the source-output interface 52 via the supply line. Also, upon the supply line being connected to the body 110, connecting the body-output interface 112 to the nozzle-input interface 32 orients the flanged connector opposite the second direction D2 in alignment with the source-output interface 52. Conversely, upon the supply line being connected to the body 110, connecting the body-input interface 114 to the source-output interface 52 via the supply line orients the body-output interface 112 opposite the first direction D1 in alignment with the nozzle-input interface 32.

Upstream of the fuel path, the source-output interface 52 defines a port 54 from which fuel is flowed to the adapter 100, and to which the flanged connector 130 is fluidly connected. The flanged connector 130 has a flange 132 and a cylinder 134, or cylindrical fitting (similar to that illustrated in FIG. 11 with respect to another embodiment) projecting from the flange 132 along a connector axis C. The port 54 is shaped complementarily to the cylinder 134, in this case a bore extending along a port axis P oriented in the second direction D2 by the second mount 60. Upon the flanged connector 130 being connected to the port 54, the connector and port axes C, P are collinear. A fastening means of the flanged connector 130, in this case bolts mechanically coupled to complementary bores defined by the flange 132 and the source-output interface 52, determines an orientation of the supply line with respect to the port axis P as it fastens the supply line to the source-output interface 52. By orienting the supply line together with the body 110 with respect to the port axis P, the flanged connector 130 is used to locate the body-output interface 112 in alignment with the nozzle-input interface 32.

Figure 4:
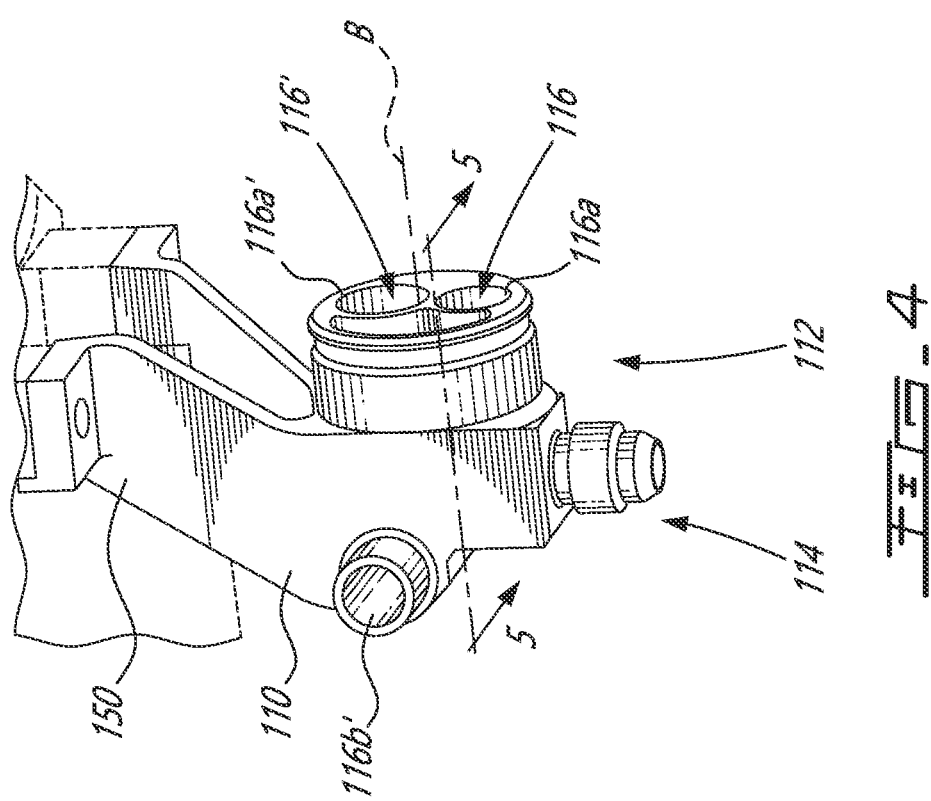
FIG. 4 is a perspective view of a body of the fuel manifold adapter of FIG. 3, a transfer tube assembly of the fuel manifold adapter having been removed.

Referring to FIGS. 3 to 7, fuel-path defining features will now be described with respect to another embodiment of the adapter 100. Downstream of the source 50, the primary fuel path is defined by the supply line, i.e., by the flanged connector 130 and the conduit 140, successively. Downstream of the supply line, the primary fuel path is defined a first passage 116 extending through the body 110. The body-input interface 114 defines an upstream end 116$b$ of the first passage 116 to which the conduit 140 is fluidly connected. The body-output interface 112 of the body 110 is cylindrical in shape and extends along a body axis B (FIG. 4). The body-output interface 112 defines a downstream end 116a of the first passage 116 in fluid communication with the upstream end 116b, also referred to as a first body bore 116a of the body 110.

Downstream of the source 50, the secondary fuel path is defined by a second supply line, i.e., by a second flanged connector 130' and a second conduit 140', successively. Downstream of the second supply line, the secondary fuel path is defined a second passage 116' extending through the body 110. The body-input interface 114 defines an upstream end 116b' of the second passage 116' to which the second conduit 140' is fluidly connected. The body-output interface 112 defines a downstream end 116a' of the second passage 116 in fluid communication with the upstream end 116b', also referred to as a second body bore 116a' of the body 110.

The nozzle-input interface 32 is located downstream of the body-output interface 112 across from the transfer tube assembly 120. The nozzle-input interface 32 is cylindrical in shape (as shown in FIGS. 6 and 7), and extends along a longitudinal axis N (FIG. 3) oriented in the first direction D1 by the first mount 40. A first nozzle bore 34 and a second nozzle bore 34' extend in the nozzle-input interface 32 in fluid communication with the fuel manifold 20.

With reference to FIGS. 6 and 7, characteristics pertaining to the transfer tube assembly 120 and its relationship with the body-output interface 112 and the nozzle-input interface 32 will now be described. The transfer tube assembly 120 includes a first transfer tube 122 having a rigid, tubular body extending along a longitudinal axis A from a first tube end 122a to a second tube end 122b. The first tube end 122a is slidably received by the first body bore 116a, whereas the second tube end 122b extends to outside the first body bore 116a so as to be slidably receivable by the first nozzle bore 34 upon the body 110 being suitably positioned relative to the inlet nozzle 30. Around either ends 122a, 122b of the transfer tube 122, O-rings 124 may be mounted for sealing engagement with the corresponding bores, thereby sealing a passage from one bore to the other via the transfer tube 122. A second transfer tube 122' of the transfer tube assembly 120 has a rigid, tubular body extending along a longitudinal axis A' from a first tube end 122a' to a second tube end 122b'. The first tube end 122a' is slidably received by the second body bore 116a', whereas the second tube end 122b' extends to outside the second-body bore 116a' so as to be slidably receivable by the second nozzle bore 34' upon the body 110 being suitably positioned relative to the inlet nozzle 30.

According to some embodiments, the transfer tube assembly 120 includes a drain sleeve 126 extending around the transfer tube 122 from around the body-output interface 112 to around the nozzle-input interface 32. As shown in FIG. 6, O-rings 124 may be mounted around the nozzle-input interface 32 and the body-output interface 112 for sealing engagement with an inner cylindrical surface of the drain sleeve 126, thereby defining extremities of a sealed cavity inside the drain sleeve 126. However, the drain sleeve 126 may be omitted depending on the implementation.

Figure 9:
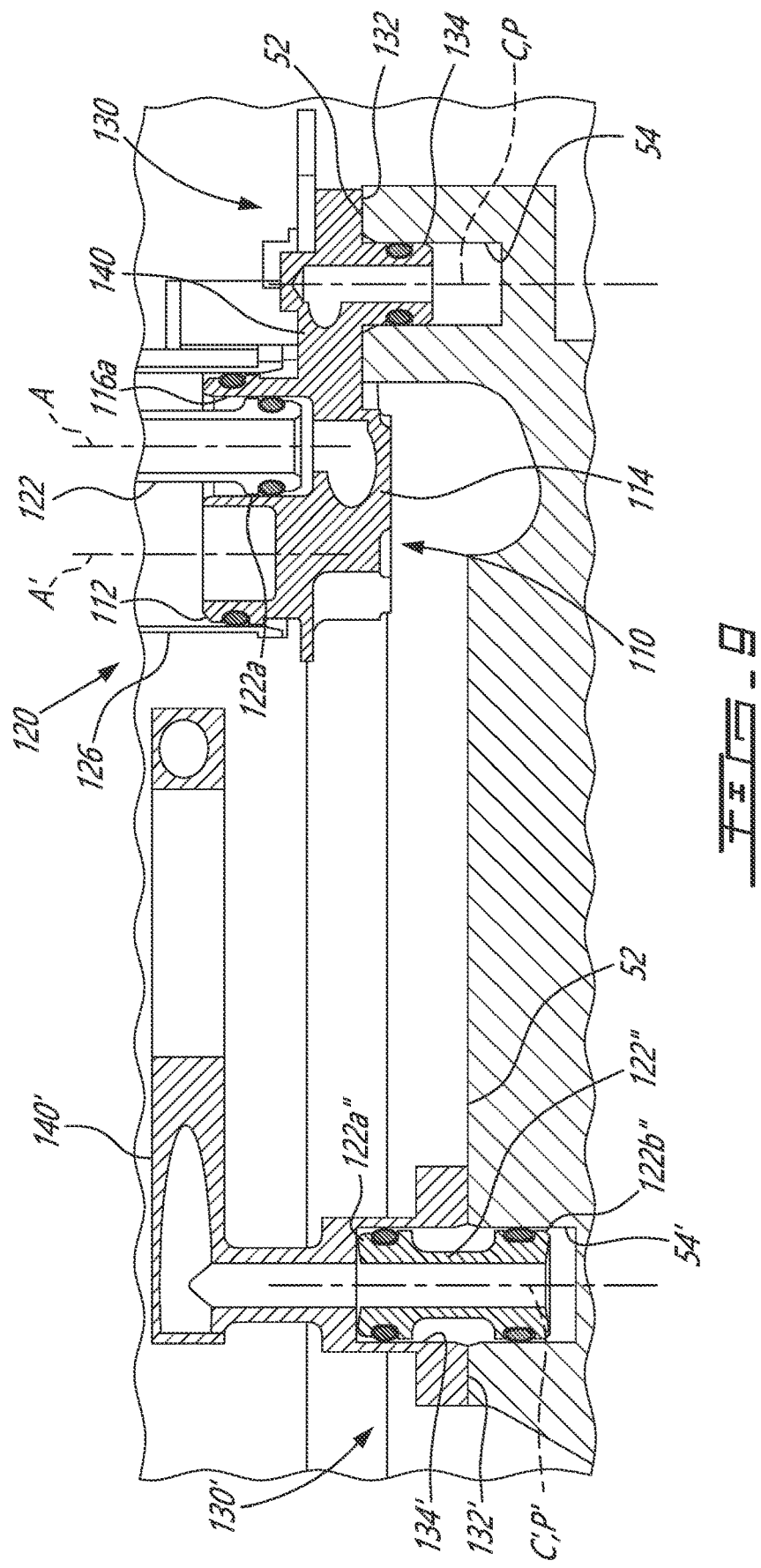
FIG. 9 is a cross-section view taken along the line 9-9 of FIG. 8.

In FIGS. 8 and 9, there is shown yet another embodiment of the adapter 100 implemented in a turboshaft engine. In this embodiment, the first mounting point is located on the turbine support case and the second mounting point is located on the peripheral flange of the turbine support case fore of the first mounting point. The third mounting point is located on the source 50, i.e., the body 110 is supported by virtue of its connection to the source 50. The body 110 may be said to be located axially between the inlet nozzle 30 and the source 50 relative to the center line of the engine 10. The nozzle-input interface 32 extends in the first direction D1 fore relative to the first mounting point and toward the second mounting point. The first direction D1 may thus be said to be toward the source 50. This arrangement of the inlet nozzle 30 relative to the source 50 allows for an axially-compact adapter 100.

In this embodiment, first and second flanged connectors 130, 130' connect to the body 110 by way of first and second conduits 140, 140', provided in the form of hollow and axially short arms that are integral to the body. The first and second conduits 140, 140' project from the body-input interface 114 transversely to the body axis B of the body-output interface 112. The nozzle-input interface 32 is closer to a first port 54 of the source 50 than to a second port 54' of the source 50. As such, the first conduit 140 is shorter than the second conduit 140'. The first flanged connector 130 is of a type similar to that described hereinabove, having a first-connector flange 132 and a first-connector cylinder 134, or cylindrical fitting, projecting therefrom along a first-connector axis C for mating engagement with the first port 54 along a first-port axis P. The second flanged connector 130' has a second-connector flange 132' and a second-connector bore 134' extending inward thereof along a second-connector axis C'. The second-connector bore 134' is in fluid communication with the second port 54' of the source-output interface 52. A third transfer tube 122a" of the adapter 100 has a first end 122a" slidably engaged with the second flanged connector 130' via the second-connector bore 134' along the second-connector axis C', and a second end 122b" opposite the first end 122a" slidably engaged with the source-output interface 52 via the second port 54' along a second-port axis P'. The source-output interface 52 is arranged such that the first-port axis P and the second-port axis P' are generally parallel and aligned with the second direction D2, thereby allowing the first flanged connector 130 to matingly engage the first port 54 simultaneously as the second flanged connector 130' engages with the second port 54' via the third transfer tube 122". Under certain circumstances, the second-port axis P' may be misaligned (e.g., be at an angle of between 0 to 4 degrees) relative to the first-port axis P, due for example to thermal deformation of the source 50 and/or to manufacturing tolerances. As the first flanged connector 130 matingly engages the first port 54 with the first-connector axis C collinear to the first-port axis P, the third transfer tube 122" may tilt relative to the second-connector axis C' and/or to the second-port axis P' to accommodate such misalignment while maintaining the fluid communication between the second port 54' and the second flanged connector 130'.

Figure 10:
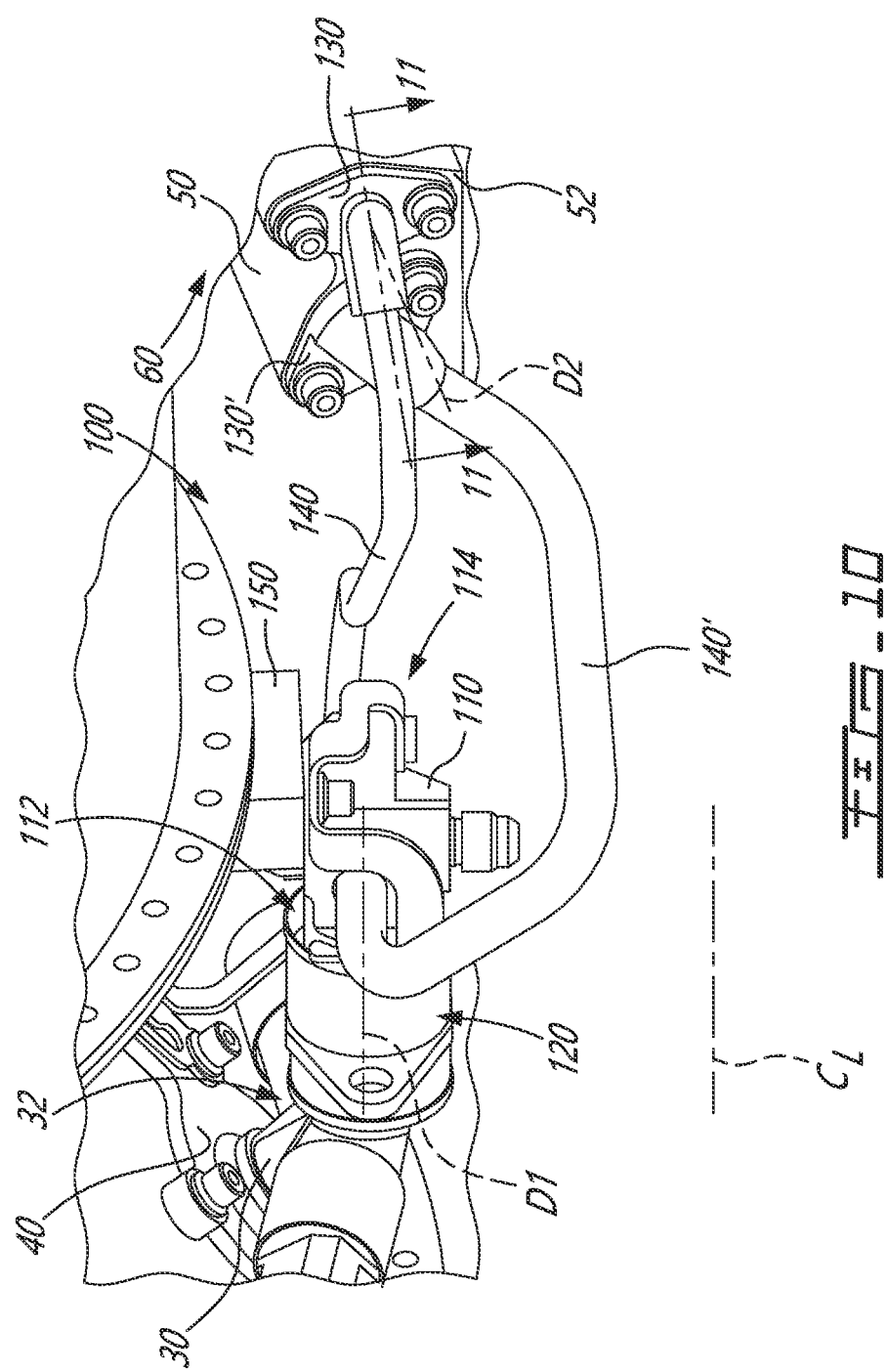
FIG. 10 is a perspective view of another embodiment of a fuel manifold adapter.

The present disclosure is not limited to aircraft engines of the turboshaft gas turbine type. For instance, in FIGS. 10 and 11, there is shown an embodiment of the fuel manifold adapter 100 implemented in an engine of the turboprop type. In this embodiment, the first mounting point is located on the turbine support case, the second mounting point is located on the turbine exhaust case at a location spaced aft and circumferentially from the first mounting point, and the third mounting point is located on the peripheral flange of the turbine support case. The nozzle-input interface 32 is oriented in the first direction D1 aft relative to the first mounting point, whereas the source-output interface 52 is oriented in the second direction D2 fore relative to the second mounting point and at an angle relative to the first direction D1. Thus, the first direction D1 and the second direction D2 are neither the same nor opposite one another. Nevertheless, such differences in location and orientation of the nozzle-input interface 32 and the source-output interface 52 are compensated by the supply line being suitably routed therebetween. With the body 110 located such that the body-output interface 112 is in alignment with the nozzle-input interface 32 opposite the first direction D1, the supply line is routed from the body-input interface 114 so as to extend opposite the second direction D2 as it nears the source-output interface 52.

It shall be noted that the same body 110 can also be used in connection to the inlet nozzle 30 of a turboshaft engine, as shown in FIG. 2, provided that the supply line is suitably routed between the body-input interface 114 of the body 110 and the source-output interface 52 of the source 50 of the turboshaft engine. The adapter 100 can thus be said to be interchangeably connectable between respective fuel manifolds and fuel sources of different aircraft engine platforms.

The embodiments described in this document provide non-limiting examples of possible implementations of the present technology. Upon review of the present disclosure, a person of ordinary skill in the art will recognize that changes may be made to the embodiments described herein without departing from the scope of the present technology. Indeed, various modifications could be implemented by a person of ordinary skill in the art in view of the present disclosure, which modifications would be within the scope of the present technology.

The invention claimed is:

1. A fuel system of an aircraft engine, comprising:
the aircraft engine having a centerline axis;
a fuel manifold having an inlet nozzle, the fuel manifold mounted at a first mounting point of the aircraft engine, the inlet nozzle having a nozzle bore facing in a first direction;
a fuel source mounted at a second mounting point of the aircraft engine, the fuel source having a source bore facing in a second direction;
a fuel manifold adapter mounted in fluid communication between the fuel source and the inlet nozzle, the fuel manifold adapter including:
a body having a body-output interface defining a downstream end of a body passage relative to a fuel flow through the fuel manifold adapter, the body passage including a body bore extending through the body about a bore axis parallel to the centerline axis, the body-output interface movably and fluidly connected to the inlet nozzle of the fuel manifold, and a body-input interface defining an upstream end of the body passage, the body-input interface rigidly and fluidly connected to the fuel source; and
a transfer tube having an upstream-tube end slidably engaged with the body along the bore axis via the body bore, the transfer tube having a downstream-tube end opposite the upstream-tube end slidably engaged along the bore axis with the nozzle bore of the inlet nozzle of the fuel manifold, the downstream-tube end defining a downstream end of the fuel manifold adapter.

2. The fuel system of claim 1, further comprising a flanged connector fixedly connected to the body of the fuel manifold adapter via the body-input interface so as to be in fluid communication with the body passage, the flanged connector fastened to the fuel source, the flanged connector defining an upstream end of the fuel manifold adapter.

3. The fuel system of claim 2, further comprising a conduit extending from a downstream-conduit end in fluid communication with the body passage to an upstream-conduit end in fluid communication with the flanged connector, the conduit rigidly connecting the flanged connector to the body of the fuel manifold adapter.

4. The fuel system of claim 3, wherein the conduit includes a rigid tube.

5. The fuel system of claim 1, further comprising a mount for mounting the body of the fuel manifold adapter to a third mounting point of the aircraft engine.

6. The fuel system of claim 5, wherein the mount and the body of the fuel manifold adapter form a unitary piece.

7. The fuel system of claim 5, wherein the body bore faces the nozzle bore of the inlet nozzle when the body is mounted to the third mounting point.

8. The fuel system of claim 7, wherein the downstream-tube end is slidably engaged with the inlet nozzle via the nozzle bore, and the body of the fuel manifold adapter is orientable about the bore axis to locate the body-input interface relative to the source bore of the fuel source.

9. The fuel system of claim 2, wherein the body passage is a first body passage, the body bore is a first body bore, the bore axis is a first-bore axis and the flanged connector is a first flanged connector, and the transfer tube is a first transfer tube;
the body-output interface defines a downstream end of a second body passage including a second body bore about a second-bore axis parallel to the first-bore axis, the downstream end of the second body passage slidably engaged with a second transfer tube, and the body-input interface defines an upstream end of the second body passage, and
the fuel manifold adapter includes a second flanged connector, the body-input interface fixedly and fluidly connected to the fuel source separately via the first body passage fluidly connected to the first flanged connector and via the second body passage fluidly connected to the second flanged connector.

10. The fuel system of claim 9, wherein the first flanged connector defines a first-connector flange and a first-connector cylinder projecting from the first-connector flange along a first-connector axis parallel to the first-bore axis, the first-connector cylinder matingly engageable with the fuel source to fluidly connect the first flanged connector to the fuel source.

11. The fuel system of claim 9, wherein the second flanged connector defines a second-connector flange and second-connector bore extending inward the second-connector flange along a second-connector axis parallel to the first-bore axis, and the fuel manifold adapter includes a third transfer tube having opposite ends respectively slidably engaged with the second flanged connector via the second-connector bore and slidably engageable with the fuel source opposite the second flanged connector to fluidly connect the second flanged connector to the fuel source.

* * * * *